United States Patent
Boyle (10) Patent No.: US 10,781,118 B2
(45) Date of Patent: Sep. 22, 2020

(54) RECIRCULATING, PURIFYING, DISINFECTING, COOLING, DECONTAMINATING FEEDBACK CONTROLLED WATER SYSTEM FOR DRINKING WATER AND OTHER USES TO IMPROVE HEALTH AND WELL BEING OF ANIMALS AND HUMANS

(71) Applicant: Stephen Boyle, Dublin (IE)

(72) Inventor: Stephen Boyle, Dublin (IE)

(73) Assignee: CUROZONE IRELAND LIMITED, Dublin (IE)

( * ) Notice: Subject to any disclaimer, the term of this patent is extended or adjusted under 35 U.S.C. 154(b) by 225 days.

(21) Appl. No.: 15/645,885

(22) Filed: Jul. 10, 2017

(65) Prior Publication Data

US 2018/0009686 A1     Jan. 11, 2018

Related U.S. Application Data

(60) Provisional application No. 62/360,893, filed on Jul. 11, 2016, provisional application No. 62/529,684, filed on Jul. 7, 2017.

(51) Int. Cl.
    *C02F 1/78*       (2006.01)
    *C02F 9/00*       (2006.01)
    (Continued)

(52) U.S. Cl.
    CPC ............... *C02F 1/78* (2013.01); *C02F 1/006* (2013.01); *C02F 1/008* (2013.01); *C02F 9/00* (2013.01);
    (Continued)

(58) Field of Classification Search
None
See application file for complete search history.

(56) References Cited

U.S. PATENT DOCUMENTS

| | | | | |
|---|---|---|---|---|
| 4,049,552 A | * | 9/1977 | Arff | ......................... C01B 13/11 |
| | | | | 210/192 |
| 4,599,166 A | * | 7/1986 | Gesslauer | ................. C02F 1/78 |
| | | | | 210/96.1 |

(Continued)

FOREIGN PATENT DOCUMENTS

| WO | 00/20343 A1 | 4/2000 |
|---|---|---|
| WO | 2012/176135 A1 | 12/2012 |

(Continued)

OTHER PUBLICATIONS

Bruce T. Stanley, "Electrolytic Ozone Generation and Its Application in Pure Water Systems", Jan. 1, 2013, XP055406512, Retrieved from the Internet: URL:http://www.ozonia.com/media/pdf/app/pure_water-e.pdf.

(Continued)

*Primary Examiner* — Richard C Gurtowski
(74) *Attorney, Agent, or Firm* — Hackler Daghighian Martino & Novak (57) ABSTRACT

A water purification system provides clean water for the consumption by livestock by using a continuously recirculating water loop. Optionally, a circulating pump moves the water within the water loop in a flow direction. A water supply inlet is fluidically connected to the water loop to provide additional water. A particle filter system (or systems) is fluidically connected in series and removes dissolved solids or particulates within the water. An ozone purification system and/or with the addition of other antimicrobial or purification agents is fluidically connected in parallel to a portion of the continuously recirculating feedback monitored and control water loop. The ozone purification system is disposed downstream of the particle filter system and RO (or similar) system in relation to the flow direction. A feeding station is connected in series with the (Continued)

continuously recirculating water loop disposed downstream of the ozone purification system in relation to the flow direction.

26 Claims, 1 Drawing Sheet

(51) Int. Cl.
*C02F 1/00* (2006.01)
*C02F 1/32* (2006.01)
*C02F 1/44* (2006.01)
*C02F 1/50* (2006.01)
*C02F 1/467* (2006.01)
*C02F 1/28* (2006.01)
*C02F 1/72* (2006.01)

(52) U.S. Cl.
CPC ............... *C02F 1/283* (2013.01); *C02F 1/32* (2013.01); *C02F 1/441* (2013.01); *C02F 1/444* (2013.01); *C02F 1/4674* (2013.01); *C02F 1/50* (2013.01); *C02F 1/722* (2013.01); *C02F 2209/02* (2013.01); *C02F 2209/03* (2013.01); *C02F 2209/06* (2013.01); *C02F 2209/10* (2013.01); *C02F 2209/23* (2013.01); *C02F 2301/046* (2013.01); *Y02W 10/37* (2015.05)

(56) References Cited

U.S. PATENT DOCUMENTS

| | | | | |
|---|---|---|---|---|
| 5,227,053 | A * | 7/1993 | Brym | C02F 9/005 210/143 |
| 2005/0139530 | A1* | 6/2005 | Heiss | C02F 9/00 210/85 |
| 2005/0279625 | A1* | 12/2005 | Hsu | C02F 9/005 204/265 |
| 2006/0027463 | A1* | 2/2006 | Lavelle | C01B 13/10 205/556 |

FOREIGN PATENT DOCUMENTS

| | | |
|---|---|---|
| WO | 2013/086217 A1 | 6/2013 |
| WO | 2015/004761 A1 | 1/2015 |

OTHER PUBLICATIONS

Scallan, E, et al., Foodborne Illness Acquired in the United States—Major Pathogens. Emerging Infectious Diseases Jan. 2011; vol. 17: pp. 7-15.

Batz, M. B., et al., Ranking the risks: the 10 pathogen food combinations with the greatest burden on public health. Emerging Pathogens Institute, University of Florida, Gainesville. 2011. https://folio.iupui.edu/bitstream/handle/10244/1022/72267report.pdf.

USDA↓ERS. USDA Economic Research Service—Cost Estimates of Foodborne Illnesses. 2014. Accessed from http://www.ers.usda.gov/data-products/cost-estimates-of-foodborne-illnesses.aspx.

* cited by examiner

RECIRCULATING, PURIFYING, DISINFECTING, COOLING, DECONTAMINATING FEEDBACK CONTROLLED WATER SYSTEM FOR DRINKING WATER AND OTHER USES TO IMPROVE HEALTH AND WELL BEING OF ANIMALS AND HUMANS

CROSS-REFERENCE TO RELATED APPLICATIONS

This non-provisional application claims priority to provisional application 62/360,893 filed on Jul. 11, 2016 and provisional application 62/529,684 filed on Jul. 7, 2017, the entire contents of which are fully incorporated herein with these references.

DESCRIPTION

Field of the Invention

The present invention generally relates to water purification systems. More particularly, the present invention relates to a water purification system that uses a novel recirculating feedback controlled water flow path to continually clean and purify the water.

Background of the Invention

Clean water is not only vital to humans, but it also vital to livestock and animals such as chickens, pigs, cattle, goats and sheep. Unfortunately, when such livestock consume dirty or infected water, many problems can result not only for the livestock but for the humans consuming such livestock. Accordingly, there is a need for an improved system to provide clean water to such livestock and humans. The present invention fulfills these needs and provides other related advantages.

SUMMARY OF THE INVENTION

This invention is a novel water purification ozone system with accessories to provide health promoting drinking water, to clean biofilms from water lines, to clean animal carcasses, to recycle water, use of antimicrobial drinking containers, use for medical, dental and veterinary applications, and every use to clean surfaces and foodstuffs and use of ozone and hydrogen peroxide vapor to disinfect animal houses after cleaning and before restocking as well as managing pathogens in human accommodation's and work places.

This novel system is applicable to all organisms including humans, cattle and water buffalo for beef and veal, sheep and lambs for lamb and mutton, goats for goat meat, pigs for pork and ham, deer for venison, horses for horse meat, poultry (mainly chickens, turkeys and ducks) and their eggs, and fish in fish farming. All organisms (including all types of fish, birds, reptiles and humans etc.) drinking water which is contaminated with numerous things such as many microorganisms, unwanted levels of total dissolved solids (such as excess pesticides and nitrates) hormones, chemicals, toxins, toxicant, carcinogenic compounds, mutagenic compounds, teratogenic compounds, cytotoxic compounds, toxic particles, etc. and sometimes too much of other components which in lower levels would be acceptable. Farmed salmon has already been reported to be contaminated with numerous toxic agents which has been present in their drinking water. Parasites in water also cause problems especially on fish. Toxic metals can be consumed from animals which can then be dangerous for humans to consume especially pregnant women. For example, drinking water for fish can increase the mercury content of the fish which in turn gets consumed by humans which is particularly bad for pregnant women and young children. Narcotic chemicals including inert gases, aliphatic and aromatic hydrocarbons, chlorinated hydrocarbons, alcohols, ethers, ketones, aldehydes, weak acids and bases, and aliphatic nitro compounds in water lead to a general reduction in biological activity in organisms called narcosis which in turn can lead to many effects on animals which are not beneficial such as less weight gain and more deaths of animals. The below novel system can solve all the above problems.

Toxicants also uncouple oxidative phosphorylation. Adenosine triphosphate is synthesized from phosphate using energy obtained from the oxidation-reduction reactions which occur in the mitochondrial electron transport chain in oxidative phosphorylation. Adenosine triphosphate production is crucial for humans and all animals etc. as this is what makes the biological systems work. These toxicants lead to more lactic acid and other organic acid concentrations accumulating more as tissues must switch to anaerobic metabolism which poison mitochondria. The below novel system will reduce or prevent this uncoupling of the oxidative phosphorylation mechanisms and will improve the beneficial oxidation-reduction reactions in the mitochondrial electron transport chain to produce more energy as well as reducing the acidity.

Drinking water often had toxic additives such as fluoride and/or chlorine and/or chloramine and/or chlorine dioxide which have many deleterious effects on the organism consuming them. This novel system removes these toxic agents as well as neutralizing heavy metals etc. Drinking water can be a significant health risk by containing excessive amounts heavy metals although some components like nitrates/nitrites and arsenic can have a more immediate impact but this novel system removes these.

Engineered nanoparticles (ENPs) are now a serious concern in drinking waters but this novel system removes these.

In the past, antimicrobial growth promoters (AGP) have been used in feeding many organisms. For example, the use of AGP in commercial poultry feed helped control Necrotic Enteritis (NE) in poultry flocks. This is caused by *Clostridium perfringens* (types A and C). Unfortunately, NE has reemerged as a major issue in poultry production, likely because of policies that ban or limit the use of AGP in poultry feeds. Also, consumers' preferences have had a major influence on bird production, and the drive for poultry production with less medication in the diet has also had a significant effect on the increased incidence of NE in the past few years. Necrotic enteritis vaccine studies show inconsistent results for effective methods of NE prevention.

The optimum growth of this *Clostridium perfringens* (types A and C) occurs at pH 6 to 7 and therefore the new system proposed in this patent uses alkaline water which will reduce the optimum growth of *Clostridium perfringens* (types A and C) as well as many other pathogens. In addition, the alkalinity of the water leads to more hydroxyl radicals in the water which in turn allows the use of ozone to be even more effective.

The main virulence of extracellular pathogens like *Clostridium perfringens* is associated with its ability to produce its 17 toxic exoproteins. These are all reductants and can be readily oxidized in a redox reaction by the novel system below thereby helping to manage this pathological condition NE. For example, *Clostridium perfringens* (CP)

can produce bacteriocins which are proteinaceous toxins which can be oxidized and reduced by ozone and oxidants and advanced oxidative processes (AOP) to reduce its effectiveness to cause NE. There is evidence that NE is caused by specific virulent CP strains that have competitive advantage over other virulent and nonvirulent CP strains partly from the production of these 17 toxic exoproteins. Antimicrobial therapy is ineffective in situations in which a virulent CP strain with competitive advantage over other CP strains acquires resistance, unlike treatment from the novel system below where ozone and AOP will kill all these pathogens and these pathogens cannot develop resistance to Ozone or AOP.

Resistant CP subpopulations that are commensal to the poultry microbiota are not necessarily detrimental (and may even be beneficial) if they inhibit the single-strain dominance effect observed in acute NE so therefore antibiotics are not the ideal way to manage this problem, whilst the use of Ozone and AOP can reduce all the pathogenic microorganisms allowing an ecological niche to be reestablished as well as other beneficial mechanisms such as neutralizing the toxins.

The below novel system can manage all the above by for example removing or reducing to a safe level the toxicants, chemicals, microorganisms or materials that can produce an unfavorable effect in living organisms.

Animals drink from containers which in turn can form a culture of microorganisms. Part of this system is also to have these containers fabricated in materials which have antimicrobial actions such as copper-zinc brass alloys, copper-nickel alloys and copper-silicon alloys or those containing silver. A unique aspect of this is that the ozonated water and AOP water which will drop on to these containers which have a synergistic antimicrobial effect which has not previously been reported. Each of these alloy types has an inherent ability to reduce biofouling, cage waste, disease, and the need for antibiotics whilst simultaneously maintaining water circulation and oxygen requirements. Other types of copper alloys are also being considered for research and development in aquaculture operations.

Uses of antibiotics in animals has increased the prevalence of antibiotic resistance in humans and in animals. This novel system will be associated with the reduced need or elimination of antibiotics, and of hormones such as growth hormones, and of toxic antimicrobial agents, and of vaccines in the drinking water. This will in turn have beneficial effects in all the animal produce such as less or no unwanted chemicals in meat or eggs or in other edible components of these animals. This in turn will increase the value of these foodstuffs considerably. Reduced needs for vaccinations will also occur.

This novel system will allow the modification of the microflora in the intestine to allow an ecological niche of "good" bacteria and other microorganisms to develop whilst suppressing "bad" bacteria and other "bad" microorganisms that can for example provoke inflammation of the gut mucosa. This novel system will also work in a similar way to the aim of prebiotics and/or probiotics and/or synbiotics and/or bacteriophages use and this in turn can act as a growth promoter which will improve the health and well-being of these organisms and in addition make the whole process more profitable for the owners and healthier for humans. Because antibiotics can remain in the gut of animals at slaughter, these antibiotics can enter the food chain by being attached to, for example, meat and therefore, this antibiotic exposure does increase antibiotic resistance in humans and in animals to whom some of these foodstuffs may be fed. Use of this system can eliminate and will certainly reduce the need for antibiotics in all organisms. When micro-organisms levels in poultry drinking water reach high levels, diarrhea can result which can cause blood poisoning if these microorganisms spread from the damaged intestines. Again, this novel system can manage this problem in poultry and other animals.

This novel system will deliver a higher food conversion efficiency (FCR—kg of feed per kg of animal produced) for organisms. Fish like salmon have an FCR around 1.1 kg of feed per kg of salmon whereas chickens have an FCR around 2.5 kg of feed per kg of chicken range and this can be improved using this novel system. Aeration of water is essential for fish as they need an appropriate level of oxygen for growth. Ozone also increases the oxygenation of the water.

This novel system use will also reduce or eliminate viruses and diseases such as found in koi carp.

This novel system also allows for recycling the water so that much less water is used per unit of production.

This novel system also allows for recycling the water where large amounts of water are used and it is important for that water to contain antimicrobial properties to kill pathogens. This novel system can reduce and sometimes eliminate all microorganisms including the following examples including *Salmonella, Campylobacter, E. Coli*, Coliform bacteria, specific pathogenic species of bacteria, viruses, and protozoan parasites such as Crytosporidium sp., *Giardia lamblia, Legionella*, etc. These micro-organisms can all be reduced using this novel system in the drinking water but also in the slaughter house and also in recycling the water. In addition, the use of much purer water does not encourage the growth of these pathogens for example in the drinking water or on these animal carcasses. The water purification system in this novel system allows for the reuse (recycling) of water such as in slaughter houses and in recirculation aquaculture systems (RAS) with indoor fish farming. This use with RAS will be particularly effective with broodstock maturation, larval rearing, fingerling production, research animal production, SPF (specific pathogen free) animal production, and caviar and ornamental fish production.

Millions of humans become ill every year from pathogens in chickens. *E. coli (Escherichia coli)* has been found in 99% of supermarket chickens. The use of this novel system in drinking water can eliminate or at least reduce these pathogens in the feces and therefore will reduce these pathogens in the food. The same applies to all other organisms. *Salmonella, Staphylococcus, Pseudomonas, Micrococcus* and many other organisms can also cause problems and will also be killed by this novel system in the drinking water. Humans working in slaughter houses also get infections from these pathogens including respiratory infections from dust and these can be eliminated or reduced using this novel system. Around 50% of meat and poultry sold has been found to be contaminated with *Staphylococcus Aureus* and over 50% of the isolated *Staphylococcus Aureus* has been shown to be resistant to most antibiotics. *Staphylococcus Aureus* can also be treated by this novel system to reduce or eliminate it. If *Staphylococcus Aureus* is left on these products then improper handling can lead to human infections. The same applies to *Salmonella* and *Campylobacter* in poultry meat.

Pathogen-food pairings attribute *Campylobacter* contaminated poultry to more illnesses than any other bacterial-food combination (Scallan E., Hoekstra R. M., Angulo F. J., Tauxe R. V., Widdowson M. A., Roy S. L., Jones J. L., Griffin P. M. Foodborne illness acquired in the United States—major pathogens. Emerg. Infect. Dis 2011; 17:7-15), and contaminated poultry alone has the greatest public health impact among all foods (Batz M. B., Hoffman S. J., Morris G. J. Ranking the risks: the 10 pathogen food combinations with the greatest burden on public health. Emerging Pathogens Institute, University of Florida, Gainesville. 2011. https://folio.iupui.edu/bitstream/handle/10244/1022/72267report.pdf.

The United States Department of Agriculture—Economic Research Service (USDA-ERS) recently released the latest cost estimates of the foodborne illness, finding that *Campylobacter* costs the United States approximately $1.9 billion in 2013. USDA-ERS. USDA Economic Research Service—Cost Estimates of Foodborne Illnesses. 2014. Accessed from http://www.ers.usda.gov/data-products/cost-estimates-of-foodborne-illnesses.aspx.

An alkaline pure water system alone is not capable of killing *Salmonella* as *Salmonella* are best killed at pH levels of 4 or below. However, the addition of ozone in this system will separately kill these *Salmonella* which otherwise will not be killed in water systems which are normally supplied in the range of pH 6 to 8.

*Salmonella* must first attach themselves to the host epithelial cells to initiate the processes of colonization and invasion. Attachment is mediated by cell surface proteins known as adhesins, with the *Salmonella enterica* serovars possessing several fimbrial and nonfimbrial adhesins that are capable of binding to intestinal epithelial cells. Ozone and AOP can modify these proteins adhesins and fimbriae to prevent this attachment by the oxidation of amino acids e.g. cysteine is oxidized to cystine and methionine is oxidized to methionine sulfoxide, thereby significantly altering these proteins adhesins and fimbriae to prevent this attachment.

There are now numerous antimicrobial resistant pathogenic organisms and the pathogenicity and virulence of certain pathogenic serotypes (e.g. *Salmonella*) have recently increased and treatment options are decreasing more and more and becoming much more expensive. Tens of millions of people suffer every year from *salmonella* infections alone.

In both chickens and turkeys as well as other organisms, septicemic bacterial infections are nearly always caused by strains of *E. coli*. This usually happens as this pathogen is normally opportunistic and can occur when the immune system is compromised. This novel system improves the immune system of organisms, examples of which are given later. Sometimes these septicemic bacterial infections can be triggered by a viral respiratory disease like Newcastle disease or infectious bronchitis or a viral immunosuppressive disease like infectious bursal disease, infectious anemia, Marek's disease of chickens, hemorrhagic enteritis of turkeys, *mycoplasma* infections like those caused by *M. gallisepticum* or *M. synoviae*. This novel system can help prevent all these diseases and therefore can help prevent septicemic bacterial infections.

This system can help control the coccidia genera including Wenyonelle, Tyzzeria, *Isospora* and *Eimeria* infections, the later of these cause coccidiosis which is a significant problem for poultry and cattle producers as well as for all organisms.

The use of ozone and advanced oxidative processes (AOP) in this system will kill microorganisms in ways which are totally different to the use of antibiotics. No organism can become resistant to the use of ozone and AOP, unlike antibiotics where microorganisms are developing so much resistance that a time may come that we will be in the post antibiotic era when many people with infections will die as they die in the pre-antibiotic days. The use of ozone and AOP in this system can oxidize the genetic material which bacteria need to obtain to allow the survival and selection of antimicrobial resistant cell lines.

This system can eliminate and/or reduce pathogens in the intestinal systems of animals and then prebiotics and/or probiotics and/or synbiotics and/or bacteriophages can be added in this system to support and help the commensal flora in these organisms. This combined unique sequence from this system including purifying the water, adding agents such as ozone and then providing for example probiotics and/or probiotics and/or synbiotics have a unique synergistic combination whereby the pathogens are first killed and then there is competitive exclusion of microbial pathogens, immune modulation, and "cross feeding", whereby beneficial microorganisms that already exist in the intestine utilize metabolites produced by probiotics to multiply. Other patents just limits discussion to bacteria whereas this patent speaks about microorganisms which also includes viruses, yeasts, etc. For example, there are many good yeasts which play a role in the development and maintenance of a healthy gut flora in organisms. This novel system can lead to altered toll-like receptor-2 and cytokine profiles, effector molecules which activate immunity as well as regulation of intestinal microbial homeostasis, stabilization of the gastrointestinal barrier function, expression of bacteriocins, enzymatic activity inducing absorption and nutrition, immunomodulatory effects, and interference with the ability of pathogens to colonize and infect the mucosa. Benefits of this novel system also include; competitive exclusion of pathogenic bacteria, stimulating the immune system associated with the gut, increasing production of short-chain fatty acids, increasing epithelial integrity, reducing epithelial cell apoptosis, and stimulating the intraepithelial lymphocytes. These effects have many repercussions such as beneficially influencing intestinal function and health, including nutrient uptake, which in turn leads to numerous benefits such as healthier organisms and well as more weight gains in animals per unit of food consumed (improved feed conversion), improved growth, early development of innate immunity, stimulation of immune response, increased vitality, and decreased mortality.

Around 99% of pathogens cannot be cultured in media and consequentially some of the serious pathogens causing illnesses in organisms are not yet identified, however this new system kills all those pathogens and therefore their culture is not necessary to manage them.

Therefore, this novel system can be used prophylactically as well as to prevent or to treat infections in living organisms in their drinking water as well as preventing their initial infection by the use of this system to prepare places for the organisms arrival and afterwards in the killing processes where the system can kill these microorganisms to prevent both their passage to humans but also to prevent their transmission to other organisms.

This new system will have numerous benefits for and in all organisms but the example following applies to chickens as an example of one group of these benefits for organisms; some of the parameters which will be proven benefits of this novel system: performance, such as feed intake, FE, and weight gain; intestinal integrity, often assessed as a measure of high villus height and villus height:crypt depth ratio, evaluation of lesion scores, or count of goblet cell numbers; assessment of innate immune response; counts of pathogenic organisms and Litter Oocyst Counts.

Hard water builds up scales in pipes, filters and valves and this leads to additional maintenance costs. In addition, high total dissolved solids (TDS) has been correlated with toxic levels in water and animals prefer to drink water with a lower TDS. The novel system reduces both hard water and TDS. This patent can also be used to produce clean drinking water from otherwise non optimal sources such as streams, rivers, lakes, salt water sources etc.

The system can also deliver electrolytes etc. into the drinking water to provide the optimum requirements for organisms.

Drinking water for animals and especially poultry water is usually currently treated with toxic agents such as sodium chlorite which are also not healthy for the animals to drink.

Drinking water can also contain toxic levels of trace elements which can be damaging to all organisms including humans, animals and fish. For example, selenium can poison water systems from new agricultural runoff courses through normally dry, undeveloped lands, and through leaching of selenium from coal flue ash, mining and metal smelting, crude oil processing and landfill. Too much consumption of selenium leads to certain congenital disorders in oviparous species such as birds and fish. Selenium deficiency is not common in healthy humans and excess selenium increases the risk of non-melanoma skin cancer in humans. Arsenic also contaminates some drinking water. Ozone and this system can remove these agents from the drinking water.

More than 25% of worldwide drinking water supplies contain fecal contamination and an estimated 1.8 billion people globally use a source of drinking water which suffers from fecal contamination. Contaminated water results in more than half a million human deaths per year.

This novel system can remove this fecal contamination and has a low impact on the environment whilst other methods have a large effect on the environment.

Almost 50% of drinking water is contaminated with nonprescription pharmaceuticals, and about 60% of the most commonly occurring chemicals in drinking water are estrogenic hormones. This system can remove these agents.

Poultry in particular use drinking water which is contained in water lines which still contain much of the above agents and in fact also have biofilms growing on the sides of these lines which perpetuate these problems. This novel system removes these biofilms.

Much of the drinking water supplied to animals is acidic and there is evidence that it would be preferable for animals to drink alkaline water.

This novel system embodies a unique combination of systems and agents which will produce water which will deliver water to remove the microorganisms but also to remove contaminants and to neutralize toxins such as endotoxins and pollutants and reduces or eliminates toxic metals such as mercury. This novel system combines numerous parts such as first purifying water to the optimum pH. This novel system also adds the optimum amount of electrolytes and/or ozone and/or the addition of hydrogen peroxide (in all its forms and the agents which can generate hydrogen peroxide) and/or silver (or similar antimicrobial agents) in all its forms and/or all catalysts and promotors which can increase the effectiveness of ozone and/or peroxides and/or the addition of any agent treated which will lead to advanced oxidative processes occurring in the water and/or trace amount of minerals which are beneficial to animals when delivered in the correct doses and/or sodium hypochlorite and/or peroxyacetic acid and/or cetylpyridinium chloride and/or trisodium phosphate but not limited to the use of the above mentioned antimicrobial agents.

The first step in this system is to purify the water as best possible through any process such as mechanical and/or chemical filters (e.g. filter wool and/or activated carbon) and/or deionization and/or reverse osmosis and add other agents. Ozone and other oxidants and antimicrobials work much better in water which has a low organic content and this is one of the reasons why this system works so well as the organic and other components are first removed in the purifying water part before the Ozone and other oxidants and antimicrobials are added. When electrolytic ozone generators cells are used this system will use methods to separately produce ozone in a separate tank where the water will have been purified with a zero or close to zero total dissolved solids (TDS) and therefore this prevents these electrolytic ozone generators cells from getting clogged up with contaminants. This ozonated water can then be added to the main water supply.

Organisms can become ill from electrolyte stress and this system will incorporate optimum electrolytes for each species to reduce or prevent electrolyte stress.

Where deficiencies occur then certain elements can be added in the purified water such as magnesium deficiency (hypomagnesemia) which is common in humans. The highly reactive magnesium occurs invariably with a +2 oxidation state which fits very well with the use of the powerful oxidant ozone in the water.

If pathogenic micro-organisms do infect organisms, then the use of ozone and AOP can help develop an inflammatory response that increases blood flow to the infected region and delivers white blood cells that can destroy pathogens. This system assists and promotes and activates specific defenses to respond to particular pathogens recognized by the organism's body, i.e., an immune response.

Ozone is a powerful oxidant, has strong antimicrobial activity (against bacteria, viruses, yeasts and protozoa), can stimulate blood circulation and the immune response, and has analgesic effects. Being a powerful oxidant; this novel system with ozone positively affects cellular and humoral immune system, oxidizes toxins making their excretion easier, encourages production of immunocompetent cells and immunoglobulins, improves phagocytosis function of macrophages, and induces production of tumor necrotizing factor (TNF-α), leukotrienes, interleukins, and prostaglandins to reduce inflammation and accelerate tissue healing. Therefore, this novel system also helps all these organisms in the above aspects and can particularly help if any of these organisms gets infected from other sources such as their food or their environment.

This novel system also kills the avian influenza, prions and anthrax.

This novel system improves the intestinal health of organisms including chickens and turkeys, and more specifically helps prevent and control coccidiosis and necrotic enteritis.

This novel system reduces immunologic stress, has an anti-inflammatory effect and an antimicrobial effect, all of which are synergistically beneficial.

A reduction of intestinal and excreta pathogenic microorganisms together with lower emissions of sulfur-containing odorous gases from broiler excreta (and for other organisms) will be observed in response to the use of the oxidants in this novel system.

The cost of disease is much higher than the cost of preventing disease using this novel system.

This novel system can also reduce the *salmonella* in and on eggs.

This novel system is anti-infective, immune enhancing containing regulated amounts of stable reactive oxygen species which leads to a real up-regulation of anti-oxidant production in cells exposed but does not invoke unwanted inflammatory reactions.

This novel system improves the organoleptic (aesthetic) parameters of drinking water (taste and odor) which will improve the consumption levels.

Regarding poultry this novel system will be used for numerous uses including the raising and slaughter of all birds including domesticated birds such as chickens, ducks, turkeys, geese, guinea fowl, squabs, quail, pheasant, peafoul and mute swans including the purpose of farming meat or eggs for food.

This novel system can comply with all European Union standards and all World Health Organization guidelines.

This novel system removes disinfection byproducts including bromate, chlorite, haloacetic acids and trihalomethanes.

This novel system also removes inorganic chemicals including antimony, arsenic, asbestos, barium, beryllium, cadmium, chromium, copper, cyanide, fluoride, lead, mercury, nitrate, nitrite, selenium and thallium.

This novel system also removes organic chemicals including benzene, dioxin, PCBs, styrene, toluene, vinyl chloride and pesticides.

This novel system also removes alpha particles, beta particles and photon emitters, radium and uranium.

This novel system also removes Triclosan (e.g. found in anti-bacterial soap & toothpaste) which has health concerns if ingested.

This novel system can also be used with any water purification system and these methods used include physical processes such as filtration, sedimentation, and distillation; biological processes such as slow sand filters or biological active carbon; chemical processes such as flocculation and chlorination and the use of electromagnetic radiation such as UV light. The choice of method for the water purification part of this system will depend on the quality of the water being treated, the cost of the treatment process and the quality standards expected of the processed water.

Many natural spring waters would benefit from this system as well as bottling of any liquids including all beverages and alcoholic drinks.

In this novel system no bromate is formed as the bromide ions in water are removed prior to contact with the ozone.

Another advantage of ozone is that it leaves no residual disinfectant in the water. Some other ozone systems find it necessary to add a residual disinfectant after the primary disinfection process to maintain this effect. Other systems leave so much contaminants in the water from biofilms etc. in the pipes which inactivate the ozone. In this novel system, a different approach is used. Water is first purified and then AOP's are extensively used to clean the pipes etc. before any animals or humans are exposed to the water. Only after these steps are large amounts of pure ozonated water and/or AOP flushed through these water lines and therefore there is nothing remaining for the ozone to react with in these water lines or to decompose the Ozone. The ozone and other active ingredients in this novel system can then remain in the water to continue all their beneficial effects.

In this novel system, the optional use of additional silver nanoparticles combined with ozone is excellent as ozone and silver have many beneficial synergistic effects and are therefore excellent anti-microbial materials and ozone separately and/or AOP and/or silver also decomposes toxic halo-organic compounds such as pesticides into non-toxic organic products.

Distillation removes all minerals from water, and the membrane methods of reverse osmosis and nanofiltration remove most minerals. This results in demineralized water which is not considered ideal drinking water. Magnesium and calcium, and other minerals in water can help to protect against nutritional deficiency. Therefore, this novel system optionally adds magnesium at a minimum of 10 mg/l with 20-30 mg/L optimum; adds calcium at 20 mg/L minimum and a 40-80 mg/L optimum, and a total water hardness (adding magnesium and calcium) of 2 to 4 mmol/L.

Many pathogens in drinking water cannot be detected by currently used tests and the advantage of the ozone in this system is that it kills all microorganisms and therefore pathogens which currently cause problems but which are not detected will be killed by this novel system.

This novel system which purifies and then sterilizes the water with ozone can be used for all types of cooking which requires water and in addition can be used for all drinks which require water, especially to produce flavored drinks with no or minimal sugar content, or for tea and coffee etc. Many people now recommend alkaline drinks and these can be easily fabricated with this system.

Electrocoagulation could also be optionally added to this novel system which with ozone removes organics, hydrocarbons, spent polymers, chemical additives, and heavy metals such as barium, iron, boron and more.

Lauric acid, which is known for its immune-boosting as well as its antiviral, antibacterial and antifungal properties can also be added to drinking water e.g. bottled waters and all drinking waters.

Organism houses (e.g. poultry houses) can be fumigated with ozone using this novel system after cleaning the house and before the introduction of new animals to manage and/or eliminate pathogens. In addition, a low level of ozone from this novel system can be continuously delivered during the housing of these animals to control these pathogens whilst the animals are growing. This can also be used for human accommodations.

Use of this novel system in slaughter houses.

This novel system will use immersion chilling usually within four hours after slaughter where carcasses will be exposed to antimicrobial treatments using this novel system and the temperature of the water (all the water comes from the novel system) will be less than 4 degrees C. (preferably just above 0 degrees C.) utilizing a counter-current water flow so carcasses are continuously exposed to cleaner recycled water.

Some further additions in this novel system can be used to this water immersion chilling method. Sodium hypochlorite can be added at a level up to 50 ppm in the chiller as well as peracetic acid (around 200 ppm) but Ozone can be used at any level as it is passed by the FDA etc. for food treatment and its byproduct is oxygen which does not leave deleterious byproducts on the foods (and eggs where it can also be used). This novel system overcomes the problems of the systems currently in use which limit dose, which affect the food such as the appearance and taste, which are also nowhere nearly as effective to kill micro-organisms and which take a long time to work in contrast to ozone and AOP which works faster than any other agents possible to use for these purposes. This novel system with particular use of synergistic components and ozone (up to 80 ppm dissolved in the water) will allow the carcasses to be treated to eliminate or at least dramatically reduce all the pathogens usually in less than one minute immersed in this chilled water bath compared to inferior antimicrobial effectiveness for other methods which also require exceptionally long immersion times.

The highly automated, stainless steel equipment involved in the processing (scalding, picking, eviscerating, cropping) of broilers serves as the primary method of cross-contamination since contact of potentially *Campylobacter*-free carcasses with ingesta or other materials from *Campylobacter*-contaminated carcasses readily occurs. Other microorganisms are also spread in this way including *E. coli*. This novel system with some additions can treat these surfaces and prevent these contaminations when combined with the use of cleaning methods including inside-outside bird washers, brush washers and cabinet washers.

This novel system also allows for recycling the water everywhere including in slaughter houses where large amounts of water are used and it is important for that water to contain antimicrobial properties to kill pathogens. This system allows for the processes required for reclaimed water or recycled water.

The organic loads including especially the microbiological content of this wastewater can be significantly reduced through these reconditioning practices using this novel system before discharging to wastewater treatment facilities or any other outcome.

Millions of humans become ill every year from pathogens in chickens. *E. coli* has been found in 99% of supermarket chickens. The main cause of these pathogens presence is the seeping from feces from the carcass during and after the slaughter. The same applies to all other organisms. The use of this novel system also in the slaughter house after butchering will also dramatically reduce or eliminate these pathogens. *Salmonella, Staphylococcus, Pseudomonas, Micrococcus, Staphylococcus Aureus, Campylobacter, E. coli* and many other organisms can also cause problems and will also be killed by this novel system in the slaughter house. Humans working in slaughter houses also get infections from these pathogens including respiratory infections from dust and these can be eliminated or reduced using this novel system.

The treatment of the carcass with ozone in this novel system does not affect the skin color or the taste of the carcass.

This novel system also allows for recycling the water for cleaning houses for animals between batches where large amounts of water are used and it is important for that water to contain antimicrobial properties to kill pathogens. The waste water from these farms and also from the slaughter houses and other uses with these animals contributes to habitat destruction of the nearby areas and the use of this system reduces or eliminates this problem. These include condensed feces, which are often contaminated with drugs, and the waste water is also often contaminated with drugs and chemicals etc. which again affect local waterways, all of which can be managed by this novel system.

This novel system will be used in animal houses to thoroughly clean and/or disinfect and/or sterilize them before and after each batch (and sometimes during a group of animals are housed) of organisms. This system can also be used to both clean out the water delivery lines in old water delivery lines which will have biofilms to make them almost like new water lines with no biofilm and this system can also be used to clean out the entire area to reduce or eliminate pathogens.

The same applies to *Salmonella* and in poultry meat. *Salmonella* is present in most feeds e.g. fed to chickens and these feeds should be treated with this novel system using ozone or AOP or ozone and peroxide vapor methods to kill these pathogens before organisms get exposed to these foods.

This novel system will also be used to produce drinking water in all its forms which include for example using this system for bottled water or providing water for hospitals, medical and dental and veterinary uses, hotels, restaurants, homes, beverages, alcoholic drinks, mouth rinses, and in fact anywhere or in any means that drinking water or any water will would benefit from any antimicrobial and cleaning etc. actions including pollution and sewage treatments, desalination etc.

Water borne pathogens may be killed or inactivated by boiling but this requires a lot of fuel, and can be very difficult for consumers, especially where storage of boiled water in sterile conditions is difficult. Other techniques, such as filtration, chemical disinfection, and exposure to ultraviolet radiation (including solar UV) suffer from the same problems as boiling methods. This novel system overcomes this problem in an extremely energy efficient way.

This novel system can be battery (or using similar methods) so that it can be used in areas without electricity.

This novel system can be used for all treatments of humans and all animals for numerous applications including all applications when surface infections are present as this will have all the benefits listed above to improve healing, for hygiene in homes, restaurants, hotels, spas, culinary, hair salons, beauty salons, clinics of all types including medical, dental, veterinary etc. Specifically many conditions can be treated such as bed sores, diabetic ulcers which are difficult to heal, wounds, post-surgery wounds, etc. and many skin disorders are thought to have a microbial etiology such as dermatitis, eczema, psoriasis, etc. and this novel system can do all the benefits listed above to treat them. This system can also be used to kill all types of superbugs including MRSA and *C Difficile* and all types of spores including anthrax. This system can be used as a simple system to clean and/or disinfect and/or sterilize utensils and all forms of medical, dental and/or veterinary instruments and equipment.

This novel system can also be used for hand washing to kill micro-organisms.

This novel system can also be used for genital washing to kill micro-organisms and to promote healing as well as to treat any odors as this system can oxidize the volatile sulfur compounds such as methyl mercaptan and dihydrogen sulphite and hydrogen sulphide as well as other malodorous compounds. In the same way this system can be used as an oral rinse to treat halitosis as it will eliminate halitosis for at least 8 hours. In addition, it can be used as a pre-rinse before dental treatment. It can also be used for the dental unit water lines in dental offices and can be used as the pure water in autoclaves and for drinking water everywhere.

It can also be used as a home unit to clean toothbrushes and to store the brushes in. It can be used as a daily mouthwash to control oral pathogen so as to manage gum disease and holes in teeth and help mouth ulcers to heal. It can be used to treat all types of aphtous ulceration.

This novel system can also be used to reduce and/or eliminate and/or treat numerous diseases including Ebola and some examples related to sources are; food or waterborne diseases: bacterial and protozoal diarrhea, hepatitis A, and typhoid fever; vectorborne diseases: malaria, dengue fever, and yellow fever; water contact disease: schistosomiasis; animal contact disease: rabies; aerosolized dust or soil contact disease: Lassa fever; Ebola virus disease (EVD), also known as Ebola hemorrhagic fever (EHF) or simply Ebola, is a viral hemorrhagic fever of humans and other primates caused by ebolaviruses and this novel system kills Ebola virus.

This novel system can also be used to reduce and/or eliminate and/or treat many other diseases including;

Hepatitis A—viral disease that interferes with the functioning of the liver; spread through consumption of food or water contaminated with fecal matter, principally in areas of poor sanitation;

Hepatitis E—water-borne viral disease that interferes with the functioning of the liver; most commonly spread through fecal contamination of drinking water;

Typhoid fever—bacterial disease spread through contact with food or water contaminated by fecal matter or sewage; victims exhibit sustained high fevers; left untreated, mortality rates can reach 20%.

Rift Valley fever—viral disease affecting domesticated animals and humans; infection may also occur through handling of infected meat or contact with blood; geographic distribution includes eastern and southern Africa where cattle and sheep are raised; symptoms are generally mild with fever and some liver abnormalities, but the disease may progress to hemorrhagic fever, encephalitis, or ocular disease; fatality rates are low at about 1% of cases.

Water contact diseases acquired through swimming or wading in freshwater lakes, streams, and rivers:

Leptospirosis—bacterial disease that affects animals and humans; infection occurs through contact with water, food, or soil contaminated by animal urine;

Schistosomiasis—caused by parasitic trematode flatworm *Schistosoma*; fresh water snails act as intermediate host and release larval form of parasite that penetrates the skin of people exposed to contaminated water; aerosolized dust or soil contact disease acquired through inhalation of aerosols contaminated with rodent urine:

Lassa fever—viral disease carried by rats of the genus Mastomys; endemic in portions of West Africa; infection occurs through direct contact with or consumption of food contaminated by rodent urine or fecal matter containing virus particles; fatality rate can reach 50% in epidemic outbreaks.

Respiratory disease acquired through close contact with an infectious person:

Meningococcal meningitis—bacterial disease causing an inflammation of the lining of the brain and spinal cord; one of the most important bacterial pathogens is *Neisseria meningitidis* because of its potential to cause epidemics; symptoms include stiff neck, high fever, headaches, and vomiting; bacteria are transmitted from person to person by respiratory droplets and facilitated by close and prolonged contact resulting from crowded living conditions, often with a seasonal distribution; death occurs in 5-15% of cases, typically within 24-48 hours of onset of symptoms.

A list of the infection related cutaneous conditions which this novel system can improve and/or treat and/or cure and/or promote their healing through the mechanisms were described in the provisional applications and not repeated herein.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
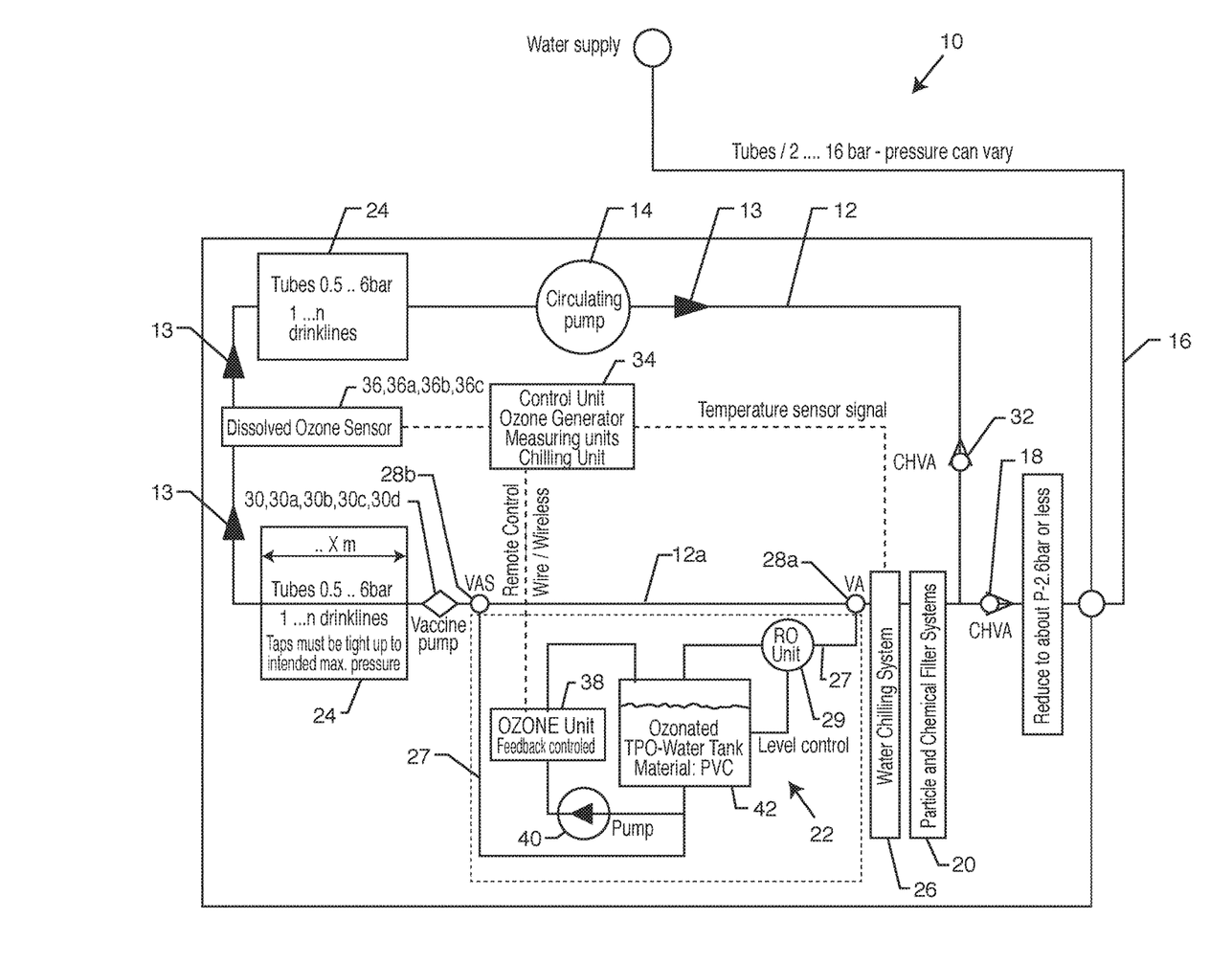
FIG. 1 is a schematic diagram of one embodiments of a novel water purification system of the present invention.

A water purification feedback controlled system 10 is disclosed in FIG. 1. FIG. 1 is a schematic diagram detailing and showing how one embodiment of the present invention can be configured to provide clean water for the consumption by livestock or other animals even including humans. A continuously recirculating water loop 12 is at the core of this invention. A circulating pump 14 is fluidically connected in series with the continuously recirculating water loop 12 and is configured to pump the water within the continuously recirculating water loop in a flow direction 13. It is understood that the pump 14 could be located anywhere along the loop 12 and need not be placed exactly where as shown. However, as shown here, one such location for the pump is after the feed stations but before the check valves as is later discussed herein. Of course, in some applications the entry water has sufficient pressure to drive this water around the system and in those circumstances the circulating pump would not be essential.

A water supply inlet 16 is fluidically connected to the continuously recirculating water loop 12 at a first check valve 18. The check valves allow water to flow in only one direction while preventing water flow in the opposite direction. The water supply inlet 16 is configured to provide additional water due to the water consumption in the water purification system 10.

A particle filter system 20 is fluidically connected in series with the continuously recirculating water loop 12. The particle filter system 20 is disposed downstream of the first check valve 18 in relation to the flow direction 13. The particle filter system is configured to remove dissolved solids or particulates within the water. The particle filter system may comprise a wide variety of filter systems known to those skilled in the art. Some examples are a granular activated carbon filter, a biological activated carbon filter, an ultrafilter, a nanofilter, a membrane filter or a reverse-osmosis membrane filter. Also, combinations of these type of filters may be used together to enhance filtration. It can also be optional to use particle filter systems at another or several points in this circulating system, for example another particle filter system can be installed after the ozone is added into this circulating system from the ozonated water tank so as to remove any precipitated compounds which will occur as a result of the contact of the ozone and/or other AOP agents with the circulating water.

An ozone purification system 22 is fluidically connected in parallel to a portion 12a of the continuously recirculating water loop 12. The ozone purification system 22 is disposed downstream of the particle filter system 20 in relation to the flow direction 13. As shown herein in this particular embodiment, the ozone purification system is an electrolytic ozone generation system. Due to the particle filter system 20 and the use of a reverse osmosis system 29 (or any similar device which aims to produce zero TDS water), the water is made virtually TDS free, which stands for Total Dissolved Solids. This in turn allows the use of the electrolytic methods of ozone generation. If the water is not virtually TDS free, the electrodes used in the electrolytic method become clogged with precipitants from the contaminants in the water. Therefore, when using the electrolytic ozone generation it is critical to clean the water fully before it undergoes electrolytic ozone generation. If other methods of ozone generation are used such as corona discharge methods or UV methods then an RO or similar system may not be required.

This novel system also works in part because it allows the water to be cleaned and re-cleaned through its continuously recirculating water loop 12. The same water will pass through the filters over and over, each time getting cleaner and cleaner. Also, unwanted contaminants may be added to the water supply when the livestock drink from the water. Therefore, re-cleaning the water keeps the water clean. Previous use of ozone without any filters in other systems did not remove the organic molecules and therefore smaller byproducts such as aldehydes, carboxylic acids and ketones were formed which will not occur in the present invention as these organic molecules are removed before any contact with ozone.

Again, the recirculation of the water allows it to pass through filters and go through the process of water purification again so that it gets re-cleaned in spite of potentially getting contaminated during its circulation. This recirculation also prevents the stagnation which currently happens at the end of the lines in animal houses such as chicken houses where large biofilms and/or microorganisms will build up. Furthermore, in these stagnation zones no new agents can be added which could purify the water further. The present invention overcomes these problems as it will provide substantially cleaner water for the consumption by livestock, such as chickens.

To the knowledge of the inventors, this novel recirculating method has not been used in chicken houses or other animal houses. In addition, filtration and filters have not been used in combination with ozone purification, where the ozone process is after it has been filtered through the various filtration systems. In addition, filtration and filters combined with systems such as an RO system have not been used in combination with ozone purification, where the ozone process is after it has been filtered through the various filtration systems and systems such as an RO system. Ozone is more effective when used on cleaner water, as the ozone is not wasted by having to react first with other contaminants. In addition, filtration and filters have not been used in the circulating system after the addition of the ozone to the circulating water in order to remove any precipitants as a result of the reaction of ozone and/or other AOP agents with the circulating water constituents.

The filter systems 20 can also remove trace organic compounds which if left in the system can lead to the formation of nitrosamines after contact with ozone. Removal of these trace organic compounds by the filter systems aims to eliminate the formation of NDMA (N-nitrosodimethylamine).

This ozone purification system 22 removes iron and manganese which improves the taste and odor of water and therefore makes the drinking water more palatable which in turn helps the animals and/or humans.

The parallel fluidic connection 27 of the ozone purification system 22 has a first controllable valve 28a disposed at the connection between the beginning of the parallel fluidic connection to the continuously recirculating water loop 12. A second controllable valve 28b is disposed at the connection between the end of the parallel fluidic connection 27 to the continuously recirculating water loop 12.

It is noted that other forms of ozone creation could be used, such as generating ozone from corona discharge. Other methods are not as critical to higher TDS levels. Other methods of ozone generation that could be used include all methods to produce ozone such as corona discharge or UV methods.

A feeding station 24 is connected in series with the continuously recirculating water loop 12. The feeding station 24 is disposed downstream of the ozone purification system 22 and the particle filter system or systems 20 in relation to the flow direction 13. The feeding station 24 is also disposed upstream of the first check valve 18. The feeding station 24 is configured to allow the livestock access to the water for consumption and is well known to those skilled in the art. More specifically, the present invention is perfect for providing water to chickens where usually the water goes down pipes one way in the chicken houses and then returns back another way but this novel system can be used with any configuration of drinklines.

Optionally, the water purification system 10 may including a water chilling system 26 which is fluidically connected in series with the continuously recirculating water loop 12. The water chilling system 26 is configured to lower the temperature of the water as in chicken coops or hen houses the drinking water can actually get extremely hot. Having a cool water source not only comforts the chickens but provides health benefits as well. As shown, the water chilling system 26 is disposed downstream of the first check valve 18 in relation to the flow direction 13, but could be placed before or after the ozone purification system 22. It would be preferable to place a water chilling system in or around the ozonated TPO water tank 42 as cooler water will allow a higher concentration of ozone to be capable of being dissolved in the water and also increases the half-life of the ozone in the water. Lagging (insulating) of all these pipes carrying the water can also assist the water not getting any hotter.

It is noted herein that chicken houses get very warm and the drinking water is about 40 degrees Celsius. This higher temperature would not allow the ozone to be very effective. Therefore, the water chilling system 26 not only makes the water more palatable for the chickens, it also makes the use of ozone more effective.

The water purification system 10 may include a vaccine pump 30 fluidically connected to the continuously recirculating water loop 12. The vaccine pump 30 is disposed downstream of the ozone purification system 22 and upstream of the feeding stations 24. The vaccine pump 30 is configured to inject a vaccine into the water of the continuously recirculating water loop. Various livestock may need from time to time various vaccines mixed with their water supply. The vaccine pump 30 is a very effective and simple way to add such vaccines to the livestock's water.

Alternatively, or in addition to a vaccine pump 30 at or near the same location, an injection station 30a may be fluidically connected to the continuously recirculating water loop 12. As with the vaccine pump 30, the injection station 30a may be disposed downstream of the ozone purification system 22 and upstream of the feeding station 24. The injection station 30a is configured to inject an agent into the water of the continuously recirculating water loop 12. The agent may be an ozone activator or an ozone promotor.

The agent may be hydrogen peroxide, silver, chlorine or chloramines or any other agents which can produce advanced oxidative processes (AOP). Normally, ozone added to a water piping system would lead to the rubber in the o-rings and other members being damages by the ozone. However, the addition of hydrogen peroxide dramatically reduces the concentration of ozone in the water. This is because then hydroxyl ions are formed which won't damage the various rubber seals and o-rings. Adding hydrogen peroxide also allows the advanced oxidative processes (AOP) to further purify the water. Again, the more pure the water is for the animals this will in turn provide a purer form of meat for human consumption.

The water purification system 10 may include a titanium dioxide photocatalysis system 30b fluidically connected in series to the continuously recirculating water loop 12 at or near the same location as the vaccine pump 30. The titanium dioxide photocatalysis system 30b is disposed downstream of the ozone purification system 22 and upstream of the feeding stations 24.

The water purification system 10 may include an ultraviolet light sanitizing station 30c which is fluidically connected in series to the continuously recirculating water loop 12 at or near the vaccine pump location. The ultraviolet light sanitizing station 30c is disposed downstream of the ozone purification system 22 and upstream of the feeding stations 26. The ultraviolet light sanitizing station 30c is configured to utilize various wavelengths of ultraviolet light to destroy harmful bacteria, bugs or other unwanted biological material. Additional ultraviolet light sanitizing stations can be positioned elsewhere in the circulating system.

The water purification system 10 may include a pH control system 30d connected to the continuously recirculating water loop. The pH control system 30d may be disposed downstream of the ozone purification system and upstream of the feeding station. The pH control system is configured to monitor, control and/or change a pH level of the water in the continuously recirculating water loop. It will be understood that the pH control system 30d may be moved to any location along the continuously recirculating water loop.

It is also understood herein that the particle filter system 20 can also provide various chemical filtering capabilities known to those skilled in the art. Furthermore, an additional particle and chemical filter system 20 can be placed in series along the continuously recirculating water loop 12 downstream of the second controllable valve 28b near the vaccine pump 30.

As shown in FIG. 1, a second check valve 32 may be fluidically connected in series with the continuously recirculating water loop 12. The second check valve 32 is disposed downstream of the feeding station but upstream of the first check valve 18. As can be understood by those skilled in the art, a variety of check valves can be added to the present invention to further ensure water flow in the same direction.

As can now be appreciated, FIG. 1 and these related descriptions describe and teach a system which could, for example, be used in chicken houses for the drinking water of chickens. This circulating loop system 10 continually puts the recirculating water through various water purification methods and filter systems and in addition adds various additives to improve the health benefits of the water as well as further enhancing its quality in other ways and to increase the effectiveness of the ozone and to allow the option of using advanced oxidative processes in this system.

In addition, this same circulating loop system can also be used beyond just animal or livestock applications. In other words, the present invention may be used for human use of drinking and cooking water and also in all the water used for washing in houses, hotels, restaurants, cafes, swimming pools, aquaria, spa's, gymnasia, in all boats, in all cruise liners, in all aspects of preparing water for drinking in every application such as bottled water or beverages or drinks containing alcohol or water which is used with all food stuffs. Again, the ozone cells utilizing electrolytic methods mentioned here could also work with other and any method for producing ozone.

The particle filters (and all the methods for purifying the water) can be added in addition in any part of the system such as an extra set which could be positioned just before the ozone unit in the circulating loop 12 part so that the water gets further purified when the water recirculates each time. More particle filters (and all the methods for purifying the water) can be positioned just after the ozonated water is delivered into the circulating loop 12 as mentioned earlier. This will also remove any dead microorganisms which had been killed by the ozone as well as any precipitants which have been formed in the water subsequent to the ozone and/or other AOP's effects. In addition, a method of delivering additives such as those mentioned within the patent application (e.g., silver) can be positioned after the ozone unit.

The cooling device is present to cool the water in the system for many benefits including increasing the effectiveness of the ozone unit as well as making the water more palatable for the animals to drink. By improving the quality of the water with animals and humans it is expected that the animals and/or human health can be improved in numerous ways. For example, it is expected that the water lines will have less biofilm, quality of the meat will be improved in animals, the animals should achieve more weight gain per units of food consumed, have better food to weight gain ratios, have less diseases, have a better quality of life, have a better gut flora and therefore a healthier gut. As discussed in this patent and the provisional applications, the numbers of pathogenic microorganisms in these animals and/or humans will be reduced. As a result, it is expected that these animals and/or humans will require less antibiotics and other chemicals and therefore they will have better health. This has major benefits to the world as it can contribute to less antibiotic resistance. This system is expected to lead to less deaths of the animals during their farming.

It is also understood that one skilled in the art can adjust the water pH for optimum effects of ozone. Therefore, the system 10 can have a method to alter the pH to allow the optimum use of whatever agents it uses.

Coagulation, flocculation and sedimentation may also be used in the system. The chemical water treatment methods of coagulation-flocculation can also be used in this system prior to sedimentation and filtration to also enhance the ability of the treatment process to remove particles. Coagulation neutralizes charges and forms a gelatinous mass to trap (or bridge) particles thus forming a mass large enough to settle or be trapped in the filters. Flocculation is gentle stirring or agitation to encourage the particles thus formed to agglomerate into masses large enough to settle or be filtered from solution.

To make all of these systems work together, a control unit 34 monitors, process and controls all the various systems described herein. For example, the control unit 34 may be hard wired or wirelessly connected to the various systems.

A dissolved ozone sensor 36 is in fluidic communication with the water flow inside the continuously recirculating water loop 12 and may be disposed downstream of the ozone purification system 22 and upstream of the feeding station 24. The control unit 34 is configured to monitor, control and/or change an ozone level of the water in the continuously recirculating water loop by adjusting the performance of the ozone purification system 22.

The ozone purification system 22 includes an ozone feedback control unit 38 and pump 40 which are connected to the TPO water tank 42. The ozone feedback control unit 38 is also in electrical communication with the control unit 34 such that the control unit 34 can control the operation of the pump 40 and ozone feedback control unit 38.

At or near the same location of the ozone sensor 36, an electrolyte sensor 36a is also in fluidic communication with the water flow inside the continuously recirculating water loop 12 and may be disposed downstream of the ozone purification system and upstream of the feeding station. The control system 34 is configured to monitor, control and/or change an electrolyte level of the water in the continuously recirculating water loop 12 by controlling the injection station 30b or other various devices.

At or near the same location of the ozone sensor 36, a temperature sensor 36b is also in fluidic communication with the water flow inside the continuously recirculating water loop 12 and may be disposed downstream of the ozone purification system and upstream of the feeding station. The control system 34 is configured to monitor, control and/or change the temperature of the water in the continuously recirculating water loop 12 by controlling the water chilling system 26.

At or near the same location of the ozone sensor 36, an agent sensor 36c is also in fluidic communication with the water flow inside the continuously recirculating water loop 12 and may be disposed downstream of the ozone purification system and upstream of the feeding station. The control system 34 is configured to monitor, control and/or change the agents in the water in the continuously recirculating water loop 12 by controlling the injection station 30b or the various particle and chemical filtration systems 20.

It is also understood that an additional temperature sensor 36b and/or an additional ozone sensor 36 could also be integrated inside the TPO water tank 42. Furthermore, any of the sensors disclosed herein could be used throughout the invention at any location along the continuously recirculating water flow 12 or within the piping of the ozone purification system 22.

Another option that can be utilized with the present invention is taught herein which is based upon the animal's sleeping schedule. Animals are usually asleep around 3 to 4 hours a night. During this sleeping time, the animals are not drinking water but rather are sleeping. During this sleeping time, the present invention can deliver higher levels of ozone and antimicrobial methods in order to treat the water with high concentrations of these agents. For example, higher concentrations could be added for one hour and then the system can circulate the water around the system's piping. Therefore, by the time the animals wake up (when the lights go back on in 2-3 hours) the ozone half-life will have dramatically depleted the amounts of ozone in the water such that it will be reduced to safe levels for consumption. Sensors can be placed within the water lines which will give feedback controlled systems which can manage the ideal ozone concentrations in the water by feeding back to the ozone generating system. In addition, these sensors can also monitor many other aspects such as the water pH and in turn these sensors can feedback to the Ph regulating method in this system. The sensors can also monitor the electrolytes and any other agents which are added into this water as well as measuring for any unwanted components.

In summary, a water purification system provides clean water for the consumption by livestock by using a continuously recirculating water loop. A circulating pump moves the water within the continuously recirculating water loop in a flow direction. A water supply inlet is fluidically connected to the continuously recirculating water loop and provides additional water. A particle filter system (or systems) is fluidically connected in series with the continuously recirculating water loop and removes dissolved solids or particulates within the water. An ozone purification system and/or with the addition of other antimicrobial or purification agents is fluidically connected in parallel to a portion of the continuously recirculating water loop. The ozone purification system may be an electrolytic ozone generation system but other ozone generating systems can be used. The ozone purification system is disposed downstream of the particle filter system and RO (or similar) system in relation to the flow direction. A feeding station is connected in series with the continuously recirculating water loop and is disposed downstream of the ozone purification system in relation to the flow direction. A UV system or systems can also be used.

Although several embodiments have been described in detail for purposes of illustration, various modifications may be made to each without departing from the scope and spirit of the invention. Accordingly, the invention is not to be limited, except as by the appended claims.

What is claimed is:

1. A water purification system configured to provide clean water for consumption by livestock or other animals, the water purification system comprising:
    a continuously recirculating water loop;
    a circulating pump fluidically connected in series with the continuously recirculating water loop configured to pump water within the continuously recirculating water loop in a flow direction;
    a water supply inlet fluidically connected to the continuously recirculating water loop at a first check valve, the water supply inlet configured to provide additional water due to the water consumption in the water purification system;
    at least one particle filter system fluidically connected as part of and in series with the continuously recirculating water loop, the at least one particle filter system configured to remove dissolved solids on particulates within the water, the at least one particle filter system disposed downstream of the first check valve in relation to the flow direction;
    an ozone purification system fluidically connected in parallel to a portion of the continuously recirculating water loop, the ozone purification system being an electrolytic ozone generation system, the ozone purification system disposed downstream of the particle filter system in relation to the flow direction; and
    a feeding station connected as part of and in series with the continuously recirculating water loop, the feeding station configured to allow the livestock or other animals access to the water for consumption wherein an unconsumed water flow is recycled back into the continuously recirculating water loop, the feeding station disposed downstream of the ozone purification system and at least one particle filter system in relation to the flow direction, the feeding station disposed upstream of the first check valve;
    wherein the continuously recirculating water loop itself comprises the at least one particle filter system, the ozone purification system and the feeding station.

2. The water purification system of claim 1, including a water chilling system fluidically connected in series with the continuously recirculating water loop, the water chilling system configured to lower the temperature of the water, the water chilling system disposed downstream of the first check valve in relation to the flow direction.

3. The water purification system of claim 1, wherein the parallel fluidic connection of the ozone purification system has a first controllable valve has a first controllable valve disposed at a connection between a beginning of the parallel fluidic connection to the continuously recirculating water loop and a second controllable valve disposed at a connection between an end of the parallel fluidic connection to the continuously recirculating water loop.

4. The water purification system of claim 1, including a vaccine pump fluidically connected to the continuously recirculating water loop, the vaccine pump disposed downstream of the ozone purification system and upstream of the feeding station, wherein the vaccine pump is configured to inject a vaccine into the water of the continuously recirculating water loop.

5. The water purification system of claim 1, including an injection station fluidically connected to the continuously recirculating water loop, the injection station disposed downstream of the ozone purification system and upstream of the feeding station, wherein the injection station is configured to inject an agent into the water of the continuously recirculating water loop.

6. The water purification system of claim 5, wherein the agent is an ozone activator, an ozone promotor or any combination thereof.

7. The water purification system of claim 5, wherein the agent is hydrogen peroxide, chlorine, chloramines or any combination thereof.

8. The water purification system of claim 1, including a titanium dioxide photocatalysis system fluidically connected in series to the continuously recirculating water loop, the titanium dioxide photocatalysis system disposed downstream of the ozone purification system and upstream of the feeding station.

9. The water purification system of claim 1, including at least one ultraviolet light sanitizing station fluidically connected in series to the continuously recirculating water loop, the ultraviolet light sanitizing station disposed downstream of the ozone purification system and upstream of the feeding station, wherein the ultraviolet light sanitizing station is configured to utilize various wavelengths of ultraviolet light to destroy harmful bacteria, bugs or other unwanted biological material.

10. The water purification system of claim 1, wherein the particle filter system comprises a granular activated carbon filter, biological activated carbon filter, an ultrafilter, a nanofilter, a membrane filter or a reverse-osmosis membrane filter.

11. The water purification system of claim 1, including a second check valve fluidically connected in series with the continuously recirculating water loop, the second check valve disposed downstream of the feeding station but upstream of the first check valve.

12. The water purification system of claim 1, including a second particle filter system disposed downstream of the ozone purification system.

13. The water purification system of claim 1, wherein the ozone purification system includes an ozonated TPO water tank.

14. The water purification system of claim 2, wherein the ozone purification system includes an ozonated TPO water tank and wherein the water chilling system is disposed adjacent to the ozonated TPO water tank.

15. The water purification system of claim 1, wherein the ozone purification system includes a reverse osmosis system.

16. The water purification system of claim 1, including a pH control system connected to the continuously recirculating water loop, the pH control system disposed downstream of the ozone purification system and upstream of the feeding station, wherein the pH control system is configured to monitor, control and/or change a pH level of the water in the continuously recirculating water loop.

17. The water purification system of claim 1, including a control unit in electrical communication with at least the ozone purification system, the control unit configured to monitor, process and control the ozone purification system.

18. The water purification system of claim 17, including a dissolved ozone sensor in fluidic communication with the water flow inside the continuously recirculating water loop disposed downstream of the ozone purification system and upstream of the feeding station, the dissolved ozone sensor in electrical communication with the control unit.

19. The water purification system of claim 17, wherein the ozone purification system includes an ozone feedback control unit and a secondary pump which are connected to a TPO water tank, wherein the ozone feedback control unit is in electrical communication with the control unit.

20. The water purification system of claim 17, including an electrolyte sensor in fluidic communication with the flow direction of the water inside the continuously recirculating water loop disposed downstream of the ozone purification system and upstream of the feeding station, the electrolyte sensor in electrical communication with the control unit.

21. The water purification system of claim 17, including a temperature sensor in fluidic communication with the water flow inside the continuously recirculating water loop disposed downstream of the ozone purification system and upstream of the feeding station, the temperature sensor in electrical communication with the control unit.

22. The water purification system of claim 17, including an agent sensor in fluidic communication with the water flow inside the continuously recirculating water loop disposed downstream of the ozone purification system and upstream of the feeding station, the agent sensor in electrical communication with the control unit.

23. A water purification system configured to provide clean water for consumption by livestock or other animals, the water purification system comprising:
 a continuously recirculating water loop;
 a water supply inlet fluidically connected to the continuously recirculating water loop at a first check valve, the water supply inlet configured to provide additional water due to the water consumption in the water purification system, and wherein the water supply inlet is configured to provide enough water pressure to pump the water within the continuously recirculating water loop in a flow direction;
 at least one particle filter system fluidically connected as part of and in series with the continuously recirculating water loop, the at least one particle filter system configured to remove dissolved solids or particulates within the water, the at least one particle filter system disposed downstream of the first check valve in relation to the flow direction;
 an ozone purification system fluidically connected in parallel to a portion of the continuously recirculating water loop, the ozone purification system disposed downstream of the particle filter system in relation to the flow direction; and
 a feeding station connected as part of and in series with the continuously recirculating water loop, the feeding station configured to allow the livestock or other animals access to the water for consumption wherein an unconsumed water flow is recycled back into the continuously recirculating water loop, the feeding station disposed downstream of the ozone purification system and at least one particle filter system in relation to the flow direction, the feeding station disposed upstream of the first check valve;

wherein the continuously recirculating water loop itself comprises the at least one particle filter system, the ozone purification system and the feeding station.

24. The water purification system of claim 23, wherein the ozone purification system is an electrolytic ozone generation system, a corona discharge system or an ultraviolet light system.

25. A water purification system configured to provide clean water for the consumption by livestock or other animals, water purification system comprising:
- a continuously recirculating water loop;
- a circulating pump fluidically connected in series with the continuously recirculating water loop configured to pump the water within the continuously recirculating water loop in a flow direction;
- a water supply inlet fluidically connected to the continuously recirculating water loop at a first check valve, the water supply inlet configured to provide additional water due to the water consumption in the water purification system;
- at least one particle filter system fluidically connected as part of and in series with the continuously recirculating water loop, the at least one particle filter system configured to remove dissolved solids or particulates within the water, the at least one particle filter system disposed downstream of the first check valve in relation to the flow direction;
- an ozone purification system fluidically connected in parallel to a portion of the continuously recirculating water loop, the ozone purification system being an electrolytic ozone generation system, the ozone purification system disposed downstream of the particle filter system in relation to the flow direction; and
- a feeding station connected as part of and in series with the continuously recirculating water loop, the feeding station configured to allow the livestock or other animals access to the water for consumption wherein an unconsumed water flow is recycled back into the continuously recirculating water loop, the feeding station disposed downstream of the ozone purification system and at least one particle filter system in relation to the flow direction, the feeding station disposed upstream of the first check valve;
- a water chilling system fluidically connected in series with the continuously recirculating water loop, the water chilling system configured to lower the temperature of the water, the water chilling system disposed downstream of the first check valve in relation to the flow direction;
- an injection station fluidically connected to the continuously recirculating water loop, the injection station disposed downstream of the ozone purification system and upstream of the feeding station, wherein the injection station is configured to inject an agent into the water of the continuously recirculating water loop; and
- a pH control system connected to the continuously recirculating water loop, the pH control system disposed downstream of the ozone purification system and upstream of the feeding station, wherein the pH control system is configured to monitor, control and/or change a pH level of the water in the continuously recirculating water loop;

wherein the continuously recirculating water loop itself comprises the at least one particle filter system, the ozone purification system and the feeding station.

26. The water purification system of claim 25, including a second particle filter system disposed downstream of the ozone purification system.

* * * * *

UNITED STATES PATENT AND TRADEMARK OFFICE
CERTIFICATE OF CORRECTION

| | | |
|---|---|---|
| PATENT NO. | : 10,781,118 B2 | Page 1 of 1 |
| APPLICATION NO. | : 15/645885 | |
| DATED | : September 22, 2020 | |
| INVENTOR(S) | : Stephen Boyle | |

It is certified that error appears in the above-identified patent and that said Letters Patent is hereby corrected as shown below:

In the Claims

Column 20, Claim 3, Line 66, the phrase "has a first controllable valve has a virst controllable valve" should read --has a first controllable valve--.

Column 23, Claim 25, Line 13, the phrase "water purification system" should read --the water purification system--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*